UNITED STATES PATENT OFFICE.

JEAN A. MATHIEU, OF BALTIMORE, MARYLAND.

MANUFACTURE OF DYE-STUFFS.

SPECIFICATION forming part of Letters Patent No. 356,368, dated January 18, 1887.

Application filed May 11, 1886. Serial No. 201,841. (No specimens.)

*To all whom it may concern:*

Be it known that I, JEAN A. MATHIEU, a citizen of France, residing at Baltimore, in the State of Maryland, have invented new and useful Improvements in the Manufacture of Dye-Stuffs, of which the following is a specification.

My invention relates to certain improvements in processes for the manufacture and purification of dye-stuffs, and especially for the separation and elimination of the several products which enter into lac dye.

The invention consists in the novel method of treatment, hereinafter set forth, and definitely pointed out in the claims annexed to this specification.

Lac dye in its commercial state contains a considerable quantity of resinous matter which is of a complex nature, containing several distinct gummy and resinous bodies, which, when recovered or separated from the crude lac, can be largely used in the arts.

I first treat the lac dye for the purpose of dissolving the resinous, oily, and gummy matters therein contained by subjecting the same to the action of turpentine, grain alcohol, wood alcohol, acetone, ether, aldehydes, or other similar substance. I may, however, employ instead of the above bisulphide of carbon or hydrocarbon, either cold or hot, by emulsion, by percolation, or by treatment with vapors of the solvents. The undissolved residuum is then placed in water and ammonia, or other alkali added. The temperature is then raised for the purpose of obtaining a further solution. After treatment with heat for a suitable time the solution is filtered, and the residuum is washed and again subjected to a repetition of the operation by treatment with the solvent specified, for the purpose of obtaining as complete a solution as possible. To the solution thus formed I add an acid to neutralize the alkali and precipitate the coloring-matter, which will be obtained in the form of a paste. This may be dried and prepared in any form required by the trade.

In order to obtain a more complete precipitation of the coloring-matter and to separate the gelatine, I add acetate of lead to the solution described above; but this step is not absolutely essential in my invention. After the precipitate is obtained it is treated with weak sulphuric acid, for the purpose of decomposing the precipitate. The solution which results will give coloring-matter. The gelatine will act as a mordant, or it may be utilized for the manufacture of glue.

The paste or powder obtained from the process may be mingled with a mordant, such as tartaric acid, Glauber's salt, acetate of soda, or other suitable material.

The process described is adapted not only to the purification of lac dye, but for other dye-stuffs, such as stick-lac, cochineal, kermes, &c.

What I claim is—

1. In the manufacture and purification of lac dyes, the process hereinbefore set forth, consisting in subjecting the material in its commercial condition to the action of a turpentine or other solvent, set forth, treating the residuum with water and an alkali, and neutralizing the free alkali, substantially as described.

2. In the manufacture and purification of lac dyes, the process hereinbefore specified, consisting in treating the material with turpentine or other solvent of the character specified, treating the residuum with water and an alkali, neutralizing the free alkali with an acid, completing the precipitation by adding acetate of lead, and treating the precipitate with dilute sulphuric acid, substantially as specified.

In testimony whereof I affix my signature in presence of two witnesses.

JEAN A. MATHIEU.

Witnesses:
J. A. RUTHERFORD,
A. H. NORRIS.